United States Patent
Pajevic et al.

(10) Patent No.: US 11,001,117 B2
(45) Date of Patent: May 11, 2021

(54) MOBILE DRIVE UNIT HAVING A SPLIT CHASSIS

(71) Applicant: Amazon Technologies, Inc., Seattle, WA (US)

(72) Inventors: Dragan Pajevic, Arlington, MA (US); Peter Thomas Colantonio, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 15/934,507

(22) Filed: Mar. 23, 2018

(65) Prior Publication Data
US 2019/0291528 A1    Sep. 26, 2019

(51) Int. Cl.
| | |
|---|---|
| *B60G 17/0195* | (2006.01) |
| *B62D 61/04* | (2006.01) |
| *B62D 21/18* | (2006.01) |
| *B60G 7/00* | (2006.01) |
| *G05D 1/02* | (2020.01) |
| *B60D 1/46* | (2006.01) |
| *B60P 1/64* | (2006.01) |

(52) U.S. Cl.
CPC ........... *B60G 17/0195* (2013.01); *B60D 1/46* (2013.01); *B60G 7/003* (2013.01); *B60P 1/6445* (2013.01); *B62D 21/18* (2013.01); *B62D 61/04* (2013.01); *G05D 1/0227* (2013.01); *B60G 2206/011* (2013.01); *B60G 2800/91* (2013.01)

(58) Field of Classification Search
CPC ................ B60G 17/0195; B60G 7/003; B60G 2800/91; B60G 2206/011; B62D 21/18; B62D 61/04; B62D 1/28; B62D 1/283; B60P 1/6445; B60D 1/46; G05D 1/0227
See application file for complete search history.

(56) References Cited

U.S. PATENT DOCUMENTS

| | | | | |
|---|---|---|---|---|
| 3,520,378 | A * | 7/1970 | Slay | ...................... B62D 61/12 180/21 |
| 3,709,313 | A * | 1/1973 | James | .................... A63H 11/10 180/21 |
| 4,128,137 | A * | 12/1978 | Booth | ...................... B62D 7/00 180/6.5 |
| 4,245,847 | A * | 1/1981 | Knott | ...................... A61G 5/06 280/47.16 |
| 4,310,167 | A * | 1/1982 | McLaurin | ................ A61G 5/00 280/250.1 |

(Continued)

FOREIGN PATENT DOCUMENTS

| | | |
|---|---|---|
| EP | 3281848 A1 | 2/2018 |
| FR | 2342197 A1 | 9/1977 |

(Continued)

OTHER PUBLICATIONS

International Patent Application No. PCT/US2019/023752; Int'l Search Report and the Written Opinion; dated Jun. 21, 2019; 14 pages.

(Continued)

*Primary Examiner* — Ruth Ilan
*Assistant Examiner* — Maurice L Williams
(74) *Attorney, Agent, or Firm* — BakerHostetler

(57) ABSTRACT

A mobile drive unit includes a pivot between the front chassis unit and the rear chassis unit, thereby diminishing the total height of the unit.

19 Claims, 5 Drawing Sheets

(56) References Cited

U.S. PATENT DOCUMENTS

| | | | | |
|---|---|---|---|---|
| 4,515,235 A * | 5/1985 | Yamamoto | ............... | B62D 1/28 16/44 |
| 5,036,935 A * | 8/1991 | Kohara | ..................... | B60T 7/22 180/168 |
| 5,435,404 A * | 7/1995 | Garin, III | ............... | A61G 5/043 180/6.5 |
| 5,630,607 A * | 5/1997 | Yancer | ..................... | B60G 3/00 280/489 |
| 5,901,805 A * | 5/1999 | Murakami | ............... | B62D 1/28 180/168 |
| 6,196,343 B1 * | 3/2001 | Strautnieks | ............ | A61G 5/043 180/22 |
| 6,206,119 B1 * | 3/2001 | Wu | ........................ | A61G 5/043 180/24.02 |
| 6,454,286 B1 * | 9/2002 | Hosino | ................... | A61G 5/06 280/124.11 |
| 6,494,474 B1 | 12/2002 | Kramer, Jr. | | |
| 7,293,801 B2 * | 11/2007 | Bertrand | ................ | A61G 5/043 280/755 |
| 7,735,591 B2 * | 6/2010 | Puskar-Pasewicz | ... | A61G 5/042 180/65.1 |
| 7,775,307 B2 * | 8/2010 | Cheng | ....................... | A61G 5/06 180/22 |
| 7,828,310 B2 * | 11/2010 | Vreeswijk | ............ | A61G 5/1078 280/250.1 |
| 8,113,531 B2 * | 2/2012 | Zhou | ....................... | A61G 5/043 180/209 |
| 8,918,202 B2 * | 12/2014 | Kawano | ............... | G05D 1/0234 700/213 |
| 9,152,149 B1 * | 10/2015 | Palamarchuk | ....... | G05D 1/0234 |
| 9,308,143 B2 * | 4/2016 | Bekoscke | .............. | B60G 3/207 |
| 2003/0020261 A1 * | 1/2003 | Perelli | ....................... | B62B 3/02 280/651 |
| 2003/0106731 A1 * | 6/2003 | Marino | ..................... | B60T 7/16 180/168 |
| 2004/0093116 A1 * | 5/2004 | Mountz | ................ | G05D 1/0274 700/216 |
| 2005/0077715 A1 * | 4/2005 | Mulhern | ............... | A61G 5/1078 280/755 |
| 2007/0018418 A1 * | 1/2007 | Huang | ................... | A61G 5/043 280/124.111 |
| 2007/0080510 A1 * | 4/2007 | Ji | ............................. | B25H 5/00 280/32.6 |
| 2014/0228999 A1 * | 8/2014 | D'Andrea | ............ | G05D 1/0022 700/214 |
| 2017/0015168 A1 * | 1/2017 | Estier | ....................... | B60G 5/02 |
| 2017/0340942 A1 * | 11/2017 | Connell | ................ | H04W 4/025 |
| 2018/0072355 A1 * | 3/2018 | Sakashita | ............... | B62D 11/04 |
| 2019/0155296 A1 * | 5/2019 | Moore | ................ | G05D 1/0234 |
| 2019/0161274 A1 * | 5/2019 | Paschall, II | .......... | G05D 1/0227 |
| 2019/0291956 A1 * | 9/2019 | Pajevic | ................ | B65G 1/1376 |
| 2019/0294175 A1 * | 9/2019 | Pajevic | ............ | G05B 19/41895 |

FOREIGN PATENT DOCUMENTS

| | | |
|---|---|---|
| GB | 2372485 A | 8/2002 |
| JP | 2012-228996 A | 11/2012 |

OTHER PUBLICATIONS

International Patent Application No. PCT/US2019/023752; Int'l Preliminary Report on Patentability; dated Oct. 8, 2020; 8 pages.

* cited by examiner

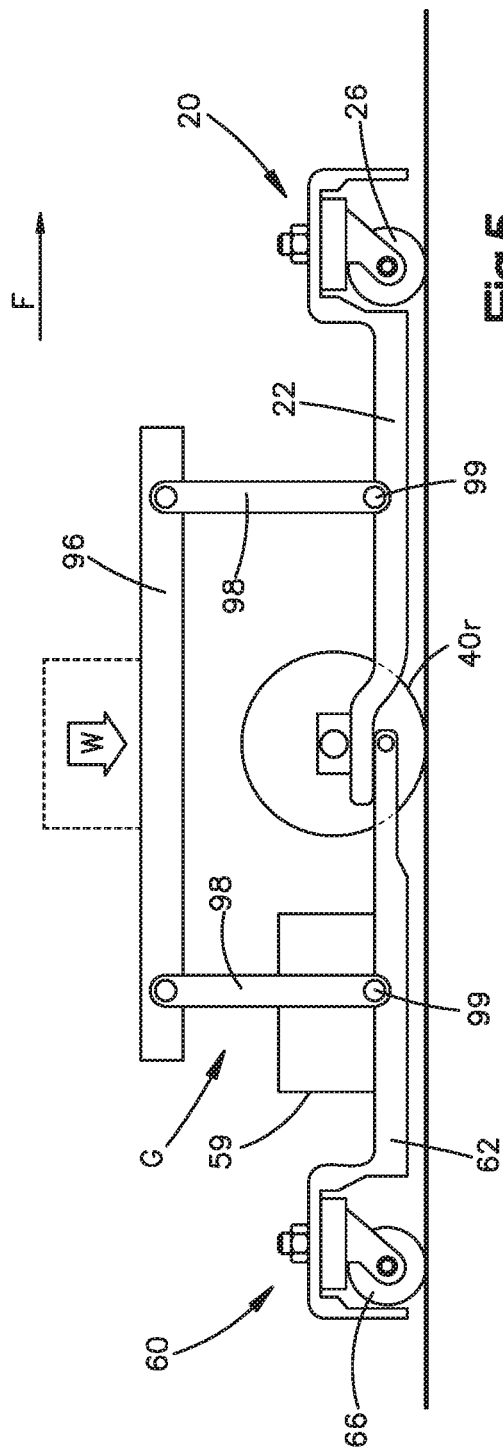
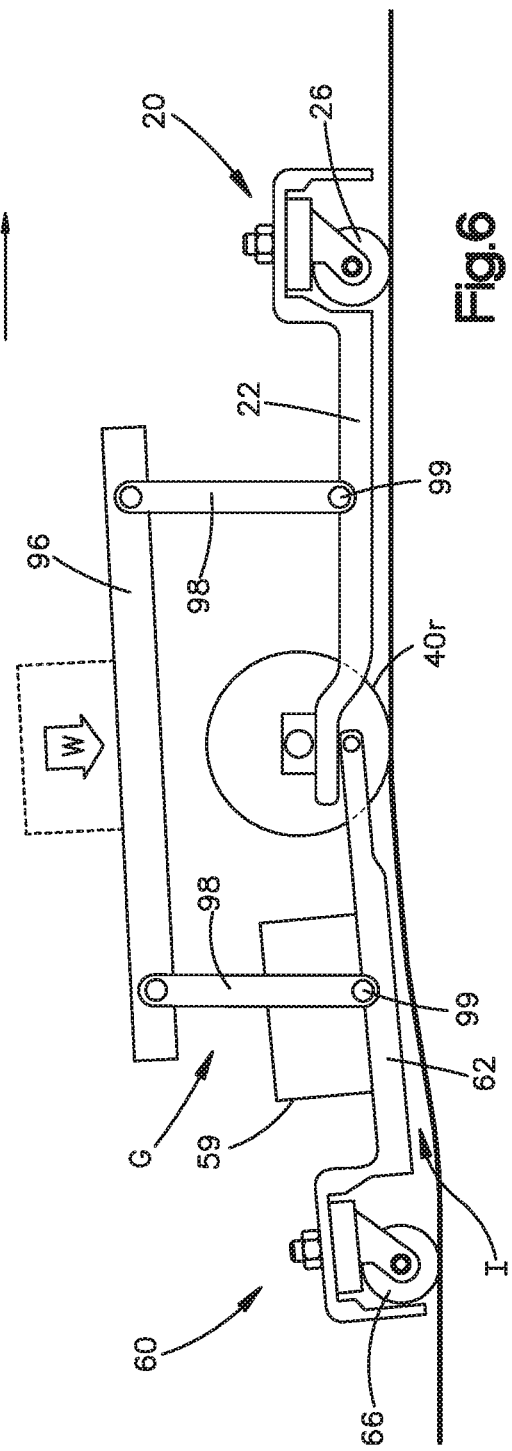

MOBILE DRIVE UNIT HAVING A SPLIT CHASSIS

BACKGROUND

The invention relates to robotic devices and methods, and more particularly to mobile drive units.

Movement of products in a modern warehouse environment, such as a fulfillment center, occurs on a vast scale. One means for managing order fulfillment is to house the products in free-standing shelving units, referred to as pods, and to transport the pods using mobile drive units. Some mobile drive units are self-powered robotic devices that travel on the floor of the warehouse guided by fiducial markers in or on the floor. The mobile drive units move beneath desired pods, lifts the pod from the floor, and transport the pods to desired locations.

One type of mobile drive unit that has been in commercial use employs a one-piece chassis having a pair of motorized midwheels, a pair of front caster wheels, and a pair of rear caster wheels, which are attached to the chassis by a suspension arm. For each of the front caster wheels and the rear caster wheels in some prior art units, the left and right caster wheels are mounted on a common shaft and spaced apart such that the left and right wheels straddle the longitudinal centerline of the mobile drive unit.

Increasing storage density enables fulfillment centers to increase the quantity, and potentially diversity of products stored, which typically leads to an enhanced consumer experience. The total height of the mobile drive unit is important variable in effectively managing storage density. Specifically, as the height of the mobile drive unit uses vertical space that could otherwise be used by pods to hold products. Further, it is common for warehouse concrete floor to have irregularities, such as expansion joints or dips inherent in building process or caused by floor wear or damage.

BRIEF DESCRIPTION OF THE DRAWINGS

FIG. 5 is a schematic view of a cross section of the chassis of FIG. 1; and

FIG. 6 is another view of the chassis of FIG. 5 illustrating operation of the chassis upon encountering an irregularity in the floor.

DETAILED DESCRIPTION OF ILLUSTRATIVE EMBODIMENTS

The following disclosure relates to solutions to problems arising from or relating (at least in part) to achieving a short mobile drive unit. One type of exemplary mobile drive unit employs a one-piece chassis having a pair of motorized midwheels, a pair of front caster wheels, and a pair of rear caster wheels, which are attached to the chassis by a suspension arm. The front caster wheels and rear caster wheels are aligned along a longitudinal centerline of the mobile drive unit. Both the front and rear have a pair of casters that are closely connected by a common arm that may cause instability or rocking during operation.

A mobile drive unit 8 configured for use in inventory fulfillment includes a chassis. The chassis described herein includes a front chassis unit and a rear chassis unit that are hinged together such that upon encountering a floor irregularity, the front and/or rear chassis can move about a pivot. The pivoting feature of the chassis enables the overall height of the mobile drive unit to have a diminished height compared with prior generations of similar mobile drive units.

Figure 1:
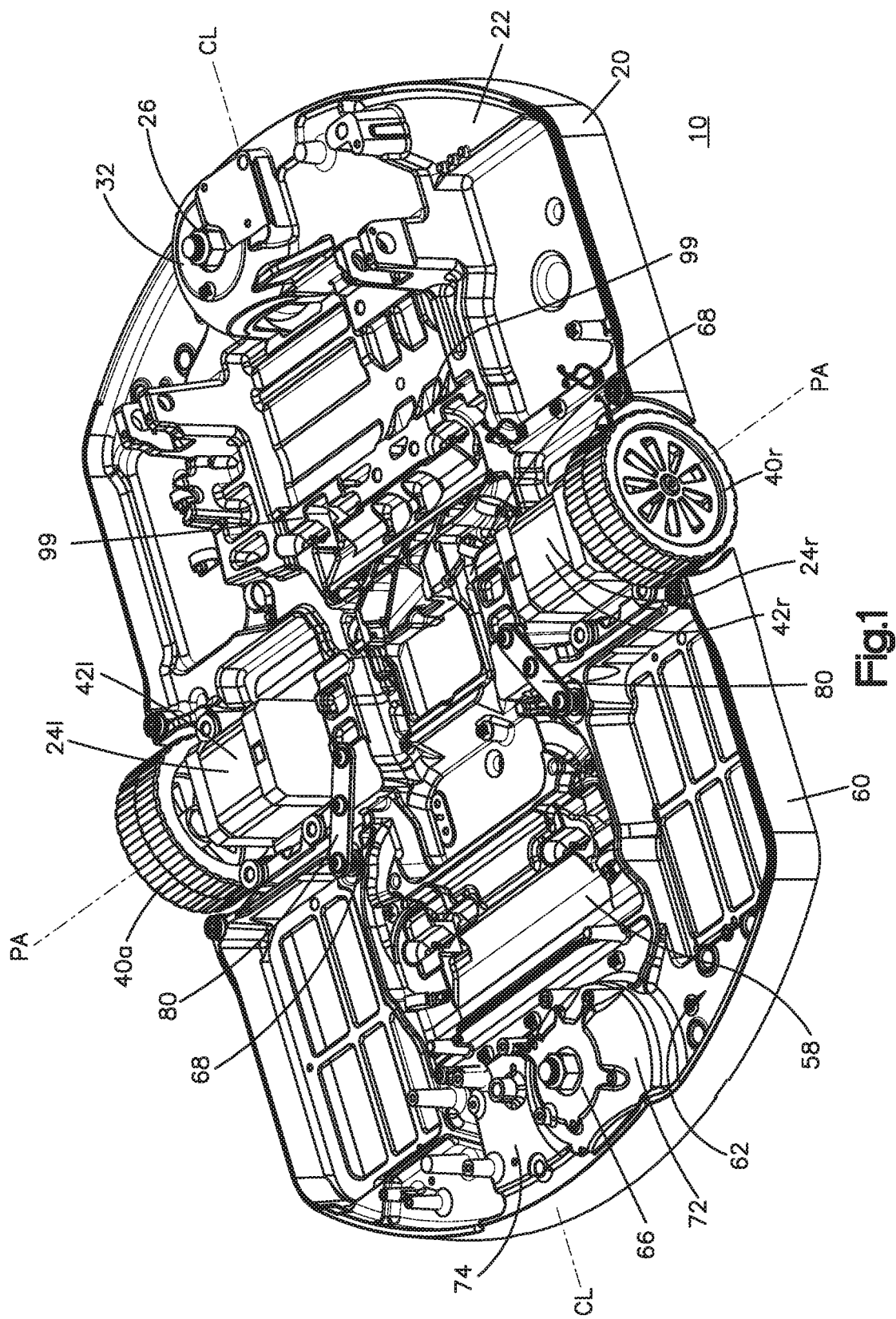
FIG. 1 is a perspective view illustrating a hinged chassis configuration.
Figure 2:
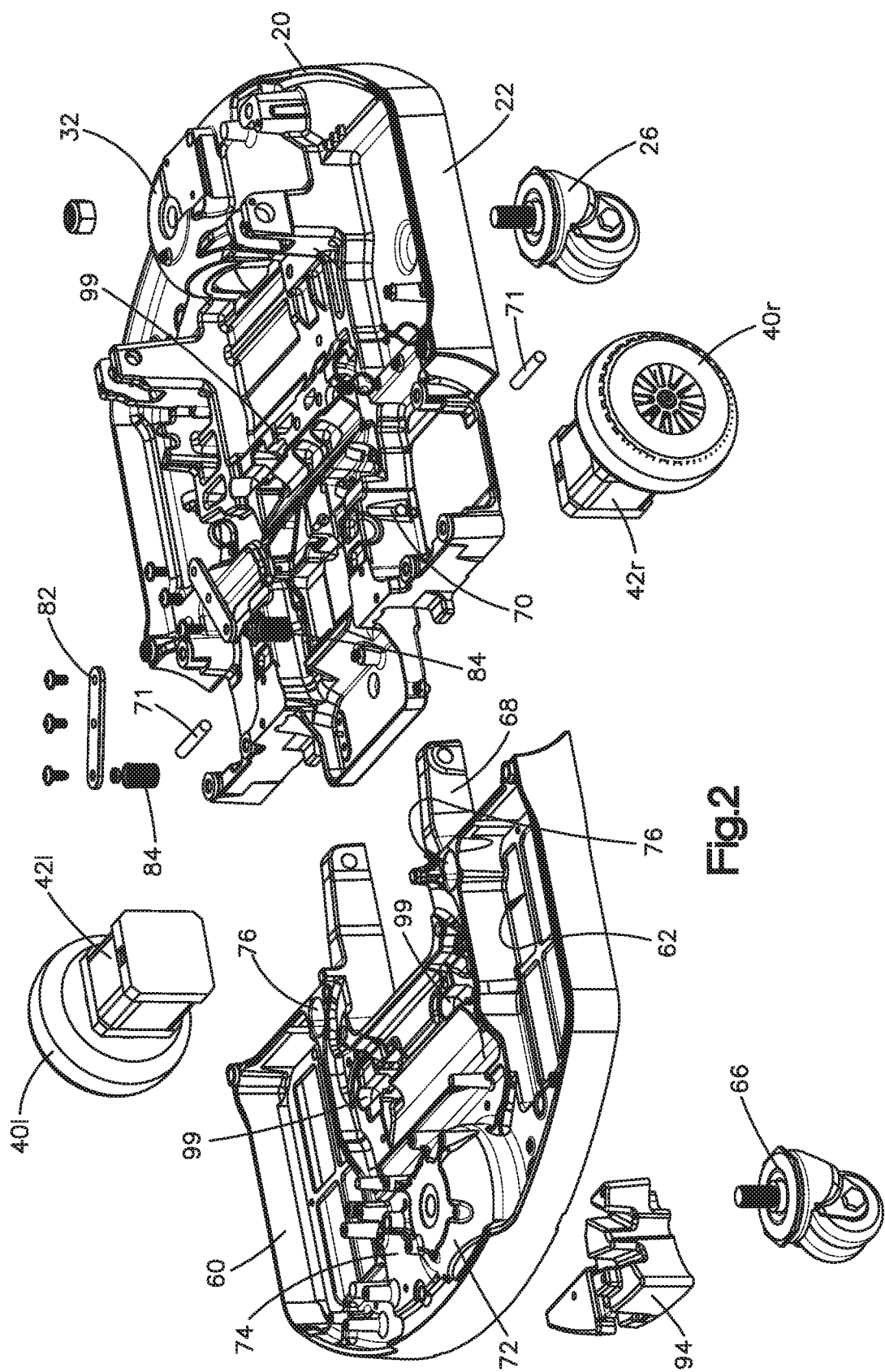
FIG. 2 is an exploded view of the chassis of FIG. 1.
Figure 3:
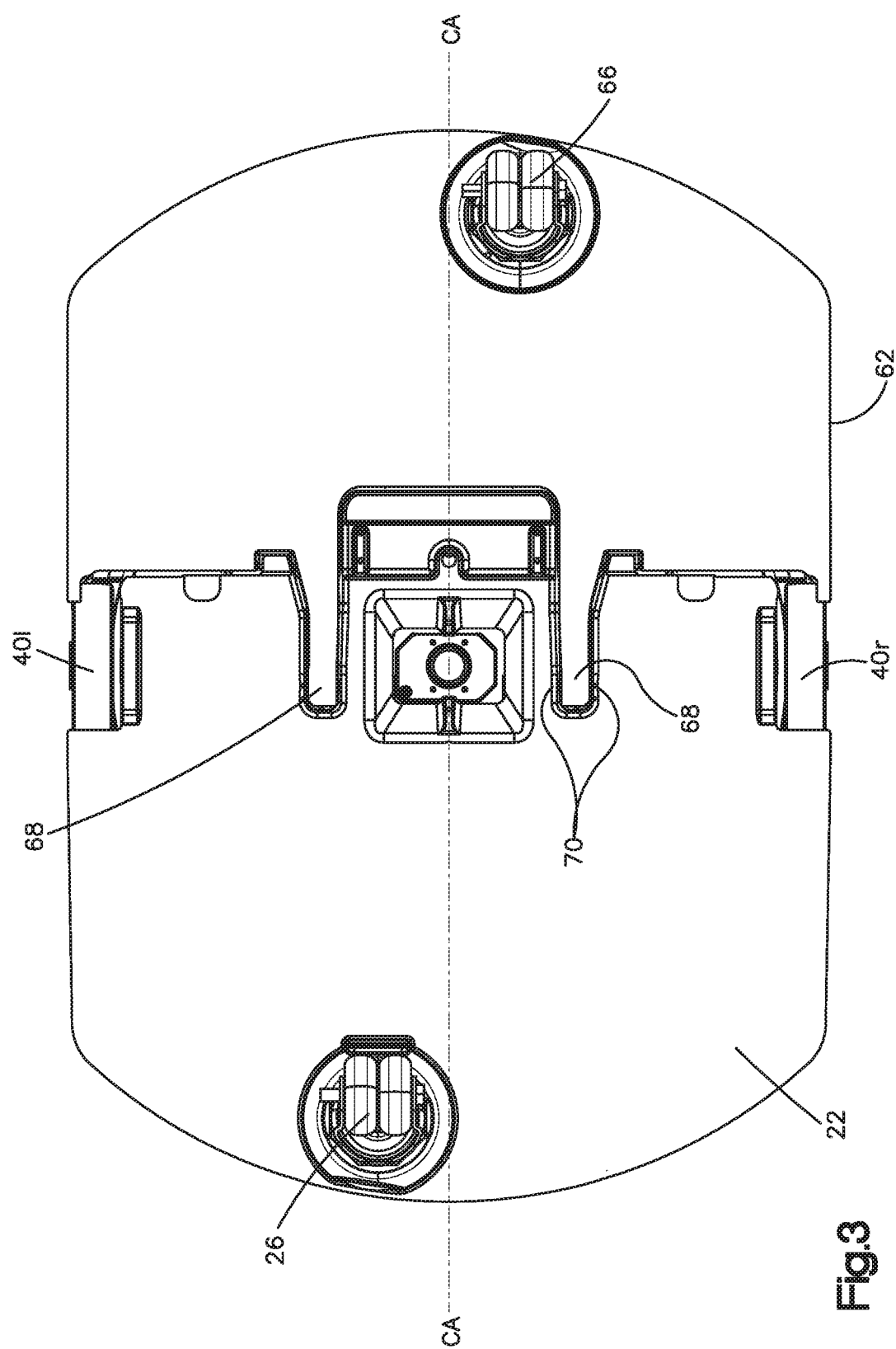
FIG. 3 is a bottom view of the chassis of FIG. 1.

Referring FIGS. 1-3, a chassis 10 of a mobile drive unit includes a first chassis assembly, such as front chassis assembly or unit 20, and a second chassis assembly, such as rear chassis assembly or unit 60. Front chassis assembly 20 includes a base 22, a pair of motorized wheel assemblies 24L and 24R, and a front caster 26. Base 22 in the embodiment shown in the figures is a one-piece aluminum casting to which the wheel assemblies 24L and 24R and front caster 26 are mounted. Base 22 includes mounts and cut outs for receiving the wheel assemblies 24L and 24R, and includes a recess for mounting front caster 26. Base 22 also includes a pair of pivot mounts 70, as explained more fully below.

Rear chassis assembly 60 includes a base 62 and rear caster 66. Base 62 preferably is a one-piece aluminum casting that includes a recess for mounting rear caster 66 and an underside recess (shown from the top as reference number 74 in FIG. 2) for mounting a ballast 94. Base 62 may also include a mount 58 for batteries. FIG. 3 illustrates aspects of the split chassis and the relationship of the caster wheels, and omits other features, such as ballast 94.

Rear chassis assembly 60 includes a pair of forward-extending arms 68 that engage pivot mounts 70 of front base 22. A pair of pins 71 (FIG. 2) link arms 68 to mounts 70 to enable front base 22 and rear base 62 to pivot relative to each other. Pins 71 define a chassis pivot axis PA (FIG. 1) about which bases 22 and 62 pivot or rotate as needed. Axis PA is horizontal and transverse. Axis PA is also perpendicular to a direction of forward motion, which is illustrated in FIG. 1 by line CL, as in the embodiment shown the direction of forward motion is parallel to the centerline CL of MDU 8. Centerline CL bisects the bases 22 and 62 and is equidistant between the drive wheel assemblies 24L and 24R.

Casters 26 and 66 are mounted to base 22 and 62 (respectively)—the caster shafts extend through the base and are affixed by bolts. Preferably, casters 26 and 66 are conventional, and may include double wheels. Casters 26 and 66 freely pivot about the vertical axis through the shafts and are not driven. Casters 26 and 66 are asymmetrically and laterally offset from centerline CL. In the embodiment shown in the figures, front caster 26 is spaced apart from centerline CL to the left and rear caster 66 is spaced apart from centerline CL to the right. The offset spacing enables the drive unit 8 to pass over a fiducial marker, such as a bar code or 3D code, in the floor without any of the wheels contacting the marker. Thus, the centerline CL of MDU 8 passes directly over a fiducial marker when the unit 8 drives forward.

Each motor assembly 24L and 24R includes a conventional motor 42L and 42R (as will be understood by persons familiar with mobile drive unit technology) and a drive wheel 40L and 40R, respectively. Wheels 40L and 40R are approximately at the midpoint (fore and aft) of mobile drive unit 8. Each wheel 40L and 40R may be driven according to control signals to move the unit 8 forward, or a direction of one of the wheels can be reversed such that the drive unit 8 can rotate in place.

A pair of spring assemblies 80 have the function of transmitting a downward force on each one of the front caster 26 and rear caster 66, and thus spring assemblies 80 diminish the downward force on drive wheels 40L and 40R. Each spring assembly 80 includes a bracket 82 that is affixed to a rear portion of front chassis base 22 and extends rearwardly to a front portion of rear chassis base 62. Spring assembly 80 includes a compression spring 84 that is located in a pocket 76 formed in rear base 62. Compression spring 84 includes an adjusting bolt that enables spring 84 a pre-load force to be set.

Figure 4:
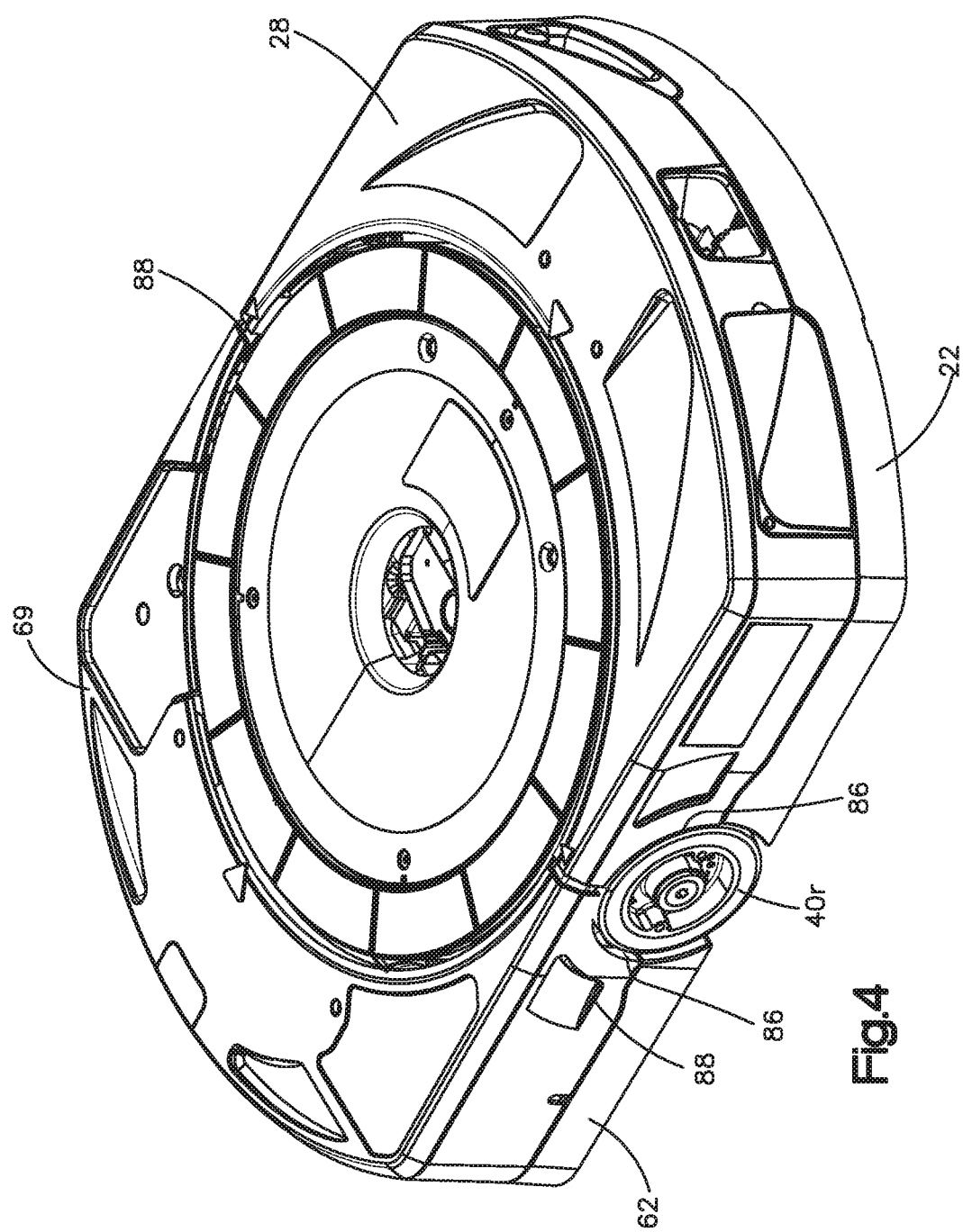
FIG. 4 is a perspective view of a chassis including a cover.

Referring to FIG. 4, mobile drive unit 8 can include a front cover 28 that is affixed to front base 22 and a rear cover 69 that is affixed to rear base 62. Each cover 28 and 69 have a cut-out portion that, with the corresponding cut-outs in bases 22 and 62, forms wheel cut-out that wheels 40L/40R extend through. In this regard, wheels 40L and 40R may extend laterally to the outboard sides of the mobile drive unit.

Each one of front base 22 and rear base 62 includes a support structure or mounts 99 for mounting a support structure 98, as explained below and shown schematically in FIGS. 5 and 6. Mounts 99 may have any configuration and supports that connect to mounts 99 may take any configuration, as mounts 99 encompass (without limitation) pivots and fixed structure.

FIG. 5 schematically illustrates front chassis unit 20 and rear chassis unit 60 carrying a load W on a top structure 96. Top structure 96 can be any structure, such as a turntable shown in FIG. 4, or any other structure without limitation. Accordingly, top structure supports 98 may be any configuration and are shown only for illustration, as will be understood and can be implemented by persons familiar with mobile drive unit technology and depending on the particular parameters of the application.

A component, such as a battery pack 59, is mounted to rear base 62 to illustrate the operation of the mobile drive unit 8 (FIGS. 5 and 6). In this regard, component/battery 59 is employed to illustrate the gap between the components of mounted on the rear chassis base 62 of the mobile drive unit 8 and the top structure 96, which gap is required to avoid damage to the components. Thus, FIG. 5 illustrates the unit on a flat surface such that top structure 96 is spaced apart from component 59 to form a gap G.

Upon receiving a drive signal from the controls to drive forward, motors 42L and 42R provide torque to wheels 40L and 40R. Upon encountering an irregularity, such a bump I, as illustrated in FIG. 6, rear chassis unit 60 follows front chassis unit 20 over irregularity I such that rear chassis unit 60 pivots relative to front chassis unit 20. Clearance gap G is maintained.

The pivoting relationship is distinguished from prior mobile drive units, in which component 59 (or the highest vertical component on the rear unit) was affixed to an extension of the front chassis such that encountering the irregularity I shown in FIG. 6 eliminated gap G, enabling the top structure to contact the components. To prevent the contact between the top structure and the components, prior art mobile drive units where configured with a greater gap and therefore an overall greater height compared with the mobile drive unit 8. In this regard, in the embodiment shown, both the highest vertical component mounted and the support structure 98 for the top structure are located on the rear chassis unit base 62.

The structure described herein enables a lower overall height. Prior mobile drive units had a total height of 10 inches or greater. Mobile drive unit 8 has a total height of 7.785 inches.

The mobile drive unit includes controllers, cameras and other sensors, a docking port, a turntable, motors to lift and rotate the turntable, and the other components. A person familiar with mobile drive unit technology will understand how to mount and employ the additional components to the front and rear chassis units disclosed herein according to the particular goals and design of the mobile drive unit application.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A mobile drive unit chassis assembly for traversing a floor, the chassis assembly comprising:
    a front chassis unit including a pair of mid-chassis drive wheel assemblies and a front caster assembly mounted to a front chassis base;
    a rear chassis unit including a rear caster assembly mounted on a rear chassis base,
    a pivotal connection between the rear chassis base and the front chassis base;
    each one of the front caster assembly and the rear caster assembly being asymmetrically offset from a driving-direction centerline of the chassis assembly; and
    whereby the pivotable connection enhances floor contact of the drive wheels and the front and rear caster assemblies when traveling over an uneven floor.

2. A mobile drive unit chassis assembly for traversing a floor, the chassis assembly comprising:
    a first chassis unit including a first chassis base, a pair of motorized drive wheel assemblies coupled to opposing sides of the first chassis base, a first load mount, and a caster assembly mounted on the first chassis base; the first load mount being adapted for receiving a portion of a load;
    a second chassis unit including a second chassis base, a second load mount, and a caster assembly mounted on the second chassis base; the second load mount being adapted for receiving another portion of the load; the second chassis base and the first chassis base coupled together by a pivotable connection, the pivotal connection defining a pivotal axis; and
    a spring assembly spanning across the pivotal axis and coupled between the first chassis base and the second chassis base, the spring assembly adapted for applying a biasing force to each one of the caster assembly of the first chassis unit and the caster assembly of the second chassis unit;
    wherein each one of a first caster wheel of the first caster assembly and a second caster wheel of the second caster assembly is asymmetrically offset from a line parallel to a direction of forward motion of the chassis assembly, the first and second caster wheels being configured such that the first and second caster wheels are spaced apart from a floor fiducial marker when the mobile drive unit passes over the floor fiducial marker in a straight line.

3. The chassis assembly of claim 2 wherein the line parallel to the direction of forward motion of the chassis assembly is a driving-direction centerline of the chassis assembly.

4. The chassis assembly of claim 3 wherein the first chassis is a front chassis unit and the second chassis is a rear chassis unit, and the mobile drive unit is configured to carry a pod.

5. The chassis assembly of claim 4 wherein the first caster assembly is a front caster assembly, the first caster wheel is a front caster wheel, the second caster assembly is a rear caster assembly, and the second caster wheel is a rear caster wheel and wherein spring assembly is adapted to provide a biasing force applying a downward force to each one of the front caster wheel and the rear caster wheel.

6. The chassis assembly of claim 5 wherein the front chassis unit has a single-piece base that is a casting, and the rear chassis unit has a single-piece base that is a casting, and the rear chassis unit includes a ballast coupled to a rear end thereof.

7. The chassis assembly of claim 4 further comprising a component mounted to the rear chassis unit, the component extending upwardly from the rear chassis unit and defining the highest vertical extend on the rear chassis unit.

8. The chassis assembly of claim 7 wherein the component is a battery that is electrically connected to the motorized drive wheels for providing power to the motorized drive wheels.

9. The chassis assembly of claim 7 further comprising a top structure that extends over at least portions of the front chassis and rear chassis, a vertical dimension between the top structure and the component defining a gap G, the pivotable connection enabling the rear chassis unit to pivot relative to the front chassis unit to at least partially maintain the gap G.

10. The chassis assembly of claim 9 wherein the first load mount is a front load mount and the second load mount is a rear load mount, the front chassis includes the first load mount and the rear chassis includes the second load mount, and wherein the load is load from the top structure.

11. The chassis assembly of claim 10 wherein the load is transmitted from the top structure to the front and rear load mounts by a support structure.

12. The chassis assembly of claim 4 including a cover, the covering including a front cover unit affixed to the front chassis unit and a rear cover unit affixed to the rear chassis unit, the front cover unit and rear cover unit being spaced apart by a gap that enables pivoting of the front chassis unit relative to the rear chassis unit.

13. The chassis assembly of claim 2 wherein the spring assembly includes a bracket that is affixed to one of the first chassis unit and the second chassis unit and a spring that applies a spring force to the other one of the first caster assembly and the second caster assembly.

14. A method of transporting a load via a mobile drive unit, comprising the steps of:
  (a) the mobile drive unit of claim 2 receiving a drive signal;
  (b) in response to the receiving step (a), powering the pair of motorized drive wheels to drive the mobile drive unit in a forward direction over the floor fiducial marker such that each one of the caster assembly of the first chassis unit and the caster assembly of the second chassis unit is asymmetrically offset relative to the floor marker; and
  (c) upon encountering a floor irregularity, the first chassis unit of the mobile drive unit pivoting relative to the second chassis unit of the mobile drive unit.

15. The method of claim 14 wherein the step (b) includes driving the mobile drive unit such that the caster assembly of the first chassis unit is on a first side of a mobile drive unit centerline and the caster assembly of the second chassis unit is on a second, opposing side of the mobile drive unit centerline.

16. The method of claim 15 wherein the mobile drive unit centerline is co-incident with the forward direction.

17. The method of claim 15 further comprising the step of biasing the first chassis unit relative to the second chassis unit to apply a force to each one of the caster assembly of the first chassis unit and the caster assembly of the second chassis unit via a spring assembly that spans a pivotal axis between the first chassis unit and the second chassis unit.

18. The method of claim 15 further comprising loading the mobile drive unit with a pod holding products.

19. The method of claim 15 wherein the driving step (c) includes a front cover unit of the front chassis unit pivoting relative to a rear cover unit of the rear chassis unit.

* * * * *